UNITED STATES PATENT OFFICE.

JACOB LAEUFER, FRANK A. THOMAS, AND JOHN F. NORMAN, OF LIMA, OHIO, ASSIGNORS TO THE LIMA BRAKE SHOE COMPANY, OF LIMA, OHIO, A CORPORATION OF OHIO.

COMPOSITION OF MATTER.

No. 909,617.      Specification of Letters Patent.      Patented Jan. 12, 1909.

Application filed February 14, 1908. Serial No. 415,876.

*To all whom it may concern:*

Be it known that we, JACOB LAEUFER, FRANK A. THOMAS, and JOHN F. NORMAN, citizens of the United States, residing at Lima, in the county of Allen and State of Ohio, have invented new and useful Improvements in a Composition of Matter, of which the following is a specification.

Our present invention relates to improvements in compositions of matter or substitute material, and more especially to that class of substances that are used for friction purposes, such for instance as composition fillings for brake-shoes, and it has for its object primarily to provide an improved artificial material of this character that possesses a relatively high co-efficient of friction, and is capable of resisting the heating tendency thereof due to the friction generated between the material and a wheel or other object with which it coöperates.

Another object of the invention is to provide an improved artificial material of this general class which is capable of resisting wear to a considerable degree so as to lengthen the life of the material when used for the purpose of a friction facing, and a further object of the invention is to provide such a composition that may be readily and cheaply manufactured of ingredients that are easily procurable, and to provide certain improvements over Letters - Patent No. 818,833, granted April 24, 1906, the compositions specified in the present instances adapting the material especially for use as a friction material or filling for composition brake-shoes and analogous devices.

The composition in its elemental form consists essentially of a body composed preferably of vegetable matter, such for instance as saw-dust, excelsior, straw or similar material which may be divided by grinding or otherwise so as to secure a degree of fineness appropriate to the desired characteristics of the resulting composition, and this constituent of the composition is hardened and solidified by an indurating and binding agent, preferably Portland cement. A heat-resisting agent is also incorporated in the composition which adapts it especially for use as a friction material, it being preferable to employ a heat resisting agent or medium, such for instance, as mineral wool or asbestos, mineral wool being employed in those instances where a high degree of heat is generated and it is desirable to increase the co-efficient of friction, while asbestos is preferably employed in those instances where considerable heat is generated but the co-efficient of friction is not necessarily so great, the smoother qualities of the asbestos counteracting in a measure any tendency of the wool to cut the surface with which it coöperates. An effective binding of the above elements is attained by the incorporation of an appropriate quantity of blood prepared preferably in the manner set forth in the Letters-Patent above referred to. In order to modify the characteristics of the composition to adapt it for particular purposes, certain ingredients are added or substituted, and these modifications of the composition will be hereinafter described.

To produce a composition in accordance with our present invention possessing a considerable degree of hardness, heat and wear resisting qualities, we propose to incorporate the ingredients in the proportion of say one pound of vegetable matter in a suitable degree of division, one-pound of mineral wool; or asbestos, the latter being preferably in a condition to retain its fibrous formation, and to these ingredients is added two pounds of cement, and these three ingredients are moistened and reduced to a plastic consistency by the addition of a suitable quantity of blood prepared in the manner above set forth, two pounds of blood to each pound of vegetable matter being usually sufficient. The mass in the plastic state is thoroughly stirred to secure an even mixing and uniform distribution of the constituents throughout the mass, and the mass is allowed to harden in a suitable mold whereby it may possess a shape appropriate to its intended uses. In preparing the composition for use as a friction facing for composition brake-shoes, it is preferable to press the mass in a plastic condition into the shell of the shoe wherein it is allowed to harden and thus lock itself in place.

It has been found from experience that the binding effect of the blood on the remaining elements of the composition may be materially assisted by adding to the mass before solidification, an appropriate quantity of potassium carbonate, a proportion preferably of about ten grains of this ingredient being incorporated for each pound of blood, the potassium carbonate acting on the albumen in the blood to toughen and strengthen the cells of the blood, and it also renders the use of bloods of various kinds appropriate, insuring a thorough cohesion of the solids composing the composition.

In order to increase the toughness of the composition and to increase the co-efficient of friction thereof, it is preferable in some cases to incorporate a suitable proportion of ground or finely divided leather, it being generally preferable to use half the usual quantity of vegetable matter and to add thereto an equal quantity of leather, or, the leather may be used as a substitute for the vegetable matter.

In preparing the composition for use as a friction material, the wearing quality of the material is prolonged and rendered more uniform by the incorporation of an appropriate lubricating agent, such for instance, as graphite or plumbago, this lubricant being added to the mixture in the proportion of one ounce thereof to each pound of vegetable matter, it being understood that the lubricating agent is distributed thoroughly throughout the mass.

In some cases it is advantageous to incorporate an additional binding agent, such for instance, as sugar which is added in the proportion of about two ounces to each pound of vegetable matter.

It will be understood of course that a composition made in accordance with our present invention is adapted for many different uses, and while it is in a plastic condition it may be molded in any shape suitable for its intended uses, but the composition given as an example in the present embodiment of the invention possesses distinct advantages as a friction material of the character used in connection with composition brake-shoes, the fibrous texture of the vegetable matter coöperating with the binding materials to effect a thorough solidification of the mass so as to prevent fracture or disintegration thereof, the fibrous structure of the vegetable matter and asbestos giving the material a considerable degree of toughness. The asbestos is particularly useful for the purpose of resisting heat generated by the friction between the material and the wheel tire or other friction surface with which it coöperates, and the asbestos also renders the composition fire-proof and gives the material a certain degree of softness or a yielding quality combined with an increased degree of toughness so that the composition when used on brake-shoes is capable of conforming to the contour of the wheel tire under considerable pressure without liability of breakage, and the softer quality of the material insures the proper degree of friction without liability of injuring or unduly wearing the tire of the wheel.

In using the composition as a friction facing for brake-shoes and similar devices, it has been found that under excessive pressures, certain ingredients give off an odor, and in using the material as friction facings for brake-shoes on vehicles operating in subways or tunnels, or in using the material as a friction medium in inclosed spaces or buildings, to add a suitable ingredient such for example as ground juniper berries incorporated with the vegetable matter will counteract or neutralize any odor of this kind that may arise by reason of such friction.

We claim as our invention:

1. A composition of the class described consisting of vegetable matter, a heat resisting agent, cement and blood thoroughly incorporated.

2. A composition of the class described consisting of finely divided vegetable matter, cement, and blood prepared by incorporating therewith potassium carbonate.

3. A composition of the class described consisting of a mixture of vegetable matter having leather incorporated therewith, a heat resisting agent, cement, blood, a lubricating substance and leather.

4. A composition of matter consisting of a mixture of vegetable matter, asbestos, cement, blood, and a lubricating substance in solid form.

5. A composition of the class described consisting of vegetable matter having ground leather mixed therewith, cement, and blood, thoroughly incorporated.

6. A composition of the class described consisting of vegetable matter having ground leather mixed therewith, mineral wool, cement, and blood, by incorporating therewith potassium carbonate.

7. A composition of the class described consisting of vegetable matter, mineral wool, cement, blood prepared by incorporating therewith potassium carbonate, and sugar thoroughly incorporated and solidified.

8. A composition of the class described consisting of vegetable matter, mineral wool, cement, blood prepared by incorporating therewith potassium carbonate, sugar, and a lubricating substance thoroughly incorporated.

9. A composition of matter consisting of a mixture of vegetable matter, asbestos, cement, blood and graphite or plumbago.

10. A composition of the class described consisting of a fibrous material, a lubricating substance, a heat resisting agent, blood and cement thoroughly incorporated.

11. A composition of the class described embodying as ingredients a fibrous material, a heat-resisting material, cement, and blood mixed and solidified.

12. A composition of the class described consisting of a suitable base material, blood, asbestos and cement.

13. A composition of the class described consisting of a suitable base material, blood, cement and graphite.

14. A composition of the class described consisting of a suitable base material, blood, sugar, asbestos and cement.

15. A friction material embodying a suitable base, blood, and a deodorizer incorporated therewith.

In testimony whereof we have hereunto set our hands in presence of two subscribing witnesses.

JACOB LAEUFER.
FRANK A. THOMAS.
JOHN F. NORMAN.

Witnesses:
JAS. W. HALPHILL,
W. B. KIRK.